(12) United States Patent
Hernandez

(10) Patent No.: US 10,951,941 B2
(45) Date of Patent: Mar. 16, 2021

(54) VEHICLE EXTERIOR MOUNTED DISPLAY SYSTEM

(71) Applicant: Jose Baltazar Hernandez, Moreno Valley, CA (US)

(72) Inventor: Jose Baltazar Hernandez, Moreno Valley, CA (US)

( * ) Notice: Subject to any disclaimer, the term of this patent is extended or adjusted under 35 U.S.C. 154(b) by 0 days.

(21) Appl. No.: 15/949,998

(22) Filed: Apr. 10, 2018

(65) Prior Publication Data

US 2018/0295406 A1 Oct. 11, 2018

Related U.S. Application Data

(60) Provisional application No. 62/483,498, filed on Apr. 10, 2017.

(51) Int. Cl.
| | |
|---|---|
| *H04N 21/414* | (2011.01) |
| *H04N 21/266* | (2011.01) |
| *G01S 19/13* | (2010.01) |
| *G06Q 30/02* | (2012.01) |
| *H04N 21/81* | (2011.01) |
| *H04N 21/422* | (2011.01) |
| *H04N 21/61* | (2011.01) |
| *H04N 21/45* | (2011.01) |

(52) U.S. Cl.
CPC ....... *H04N 21/41415* (2013.01); *G01S 19/13* (2013.01); *G06Q 30/0264* (2013.01); *G06Q 30/0266* (2013.01); *H04N 21/266* (2013.01); *H04N 21/41422* (2013.01); *H04N 21/42202* (2013.01); *H04N 21/4524* (2013.01); *H04N 21/6143* (2013.01); *H04N 21/812* (2013.01); *H04N 21/814* (2013.01)

(58) Field of Classification Search
None
See application file for complete search history.

(56) References Cited

U.S. PATENT DOCUMENTS

| | | | | |
|---|---|---|---|---|
| 2002/0158181 A1* | 10/2002 | Carter | ............... | B60R 11/04 248/560 |
| 2005/0039362 A1* | 2/2005 | Slesinski | ............... | G09F 21/04 40/590 |

(Continued)

*Primary Examiner* — Nasser M Goodarzi
*Assistant Examiner* — Terrika Peterson
(74) *Attorney, Agent, or Firm* — The Keys Law Firm PLLC

(57) ABSTRACT

A vehicle exterior mounted display system for attaching to the exterior of a moving vehicle and displaying video content that is geopositionally and temporally relevant. The vehicle exterior mounted display system includes a control unit configured to receive geolocation and time data as well as receive and process signals from a direct-broadcast satellite and a mounted display that is electrically connected to the control unit and mechanically attached to the exterior of the vehicle. The control unit selects a video stream in the signal received from the direct-broadcast satellite based on the geolocation and time data from the global navigation satellite system and causes the selected video stream to be displayed on the mounted display. The vehicle exterior mounted display system may also include an administration server that can tag the video streams in the signal from the direct-broadcast satellite with a targeted geolocation and a targeted time.

6 Claims, 2 Drawing Sheets

(56) References Cited

U.S. PATENT DOCUMENTS

| | | | | |
|---|---|---|---|---|
| 2005/0177416 | A1* | 8/2005 | Linden | G01S 19/14 |
| | | | | 705/14.62 |
| 2010/0104003 | A1* | 4/2010 | Dunn | H04N 7/16 |
| | | | | 375/240.01 |
| 2011/0252450 | A1* | 10/2011 | Adrick | H04N 21/4314 |
| | | | | 725/62 |
| 2013/0053057 | A1* | 2/2013 | Cansino | G06Q 30/0261 |
| | | | | 455/456.1 |
| 2014/0257969 | A1* | 9/2014 | Topchy | G06Q 30/0242 |
| | | | | 705/14.42 |
| 2017/0192733 | A1* | 7/2017 | Huang | G06F 3/1446 |

* cited by examiner

VEHICLE EXTERIOR MOUNTED DISPLAY SYSTEM

CROSS REFERENCE TO RELATED APPLICATIONS

This application claims the benefit of and incorporates by reference U.S. provisional patent application Ser. No. 62/483,498 filed Apr. 10, 2017.

BACKGROUND OF THE INVENTION

Field of the Invention

This invention relates generally to a mobile display system and, more particularly, to a remote controlled display system that is mounted to the exterior of a moving vehicle.

Description of the Prior Art

The use of fixed displays along roadways, such as billboards or variable-message signs to allow for the publication of advertisements or traffic/roadway information is well established. More recently, the use of on-vehicle, dynamic digital signage has become common in order to display advertisements or other visual content from moving vehicles. A problem which still exists, however, is that the timely selection of relevant content to display on a mobile display is very difficult for the operator of a vehicle. As such, such mobile display systems often struggle to be able to produce relevant content if the vehicle to which it is mounted travels outside of a small area. Thus, there remains a need for a vehicle exterior mounted display system whose visual output is controlled wirelessly from a centralized administration server. It would be helpful if such a vehicle exterior mounted display system tracked real time geolocation and time information to allow the for automatic selection of location and time relevant material. It would be additionally desirable for such a vehicle exterior mounted display system to be positioned on a larger vehicle, such as a semi-trailer, so as to maximize visibility to other motorists on a road.

The Applicant's invention described herein provides for a vehicle exterior mounted display system that is operative to display location and time specific content in real time that is transmitted wirelessly from a remote administration server. The primary aspects of Applicant's vehicle exterior mounted display system are a mounted display, a control unit, and an administration server. When in operation, the vehicle exterior mounted display system allows location and time relevant information to be displayed and updated in real time as the vehicle on which the display is mounted moves around through the day/night. As a result, many of the limitations imposed by prior art systems and apparatus are removed.

SUMMARY OF THE INVENTION

A vehicle exterior mounted display system, comprising: a control unit configured to receive geolocation and time data from a global navigation satellite system, receive and process signals from a direct-broadcast satellite; a mounted display defined by at least one electronic visual display, wherein said mounted display is electrically connected to the control unit and configured to be attached to an exterior of a moving object; and wherein said control unit is configured to select a video stream in the signal received from the direct-broadcast satellite based on the geolocation and time data from the global navigation satellite system and to cause the selected video stream to be displayed on the mounted display.

In some embodiments, the vehicle exterior mounted display system includes an administration server communicatively connected to the direct-broadcast satellite and configured to indicate a targeted geolocation and a targeted time for individual video streams in the video streams in the signal from the direct-broadcast satellite.

It is an object of this invention to provide a vehicle exterior mounted display system that allows geo-location and time relevant information to be displayed and updated in real time as the vehicle on which the display is mounted moves around through the day/night.

This and other objects will be apparent to one of skill in the art.

DETAILED DESCRIPTION OF THE INVENTION

Figure 1:
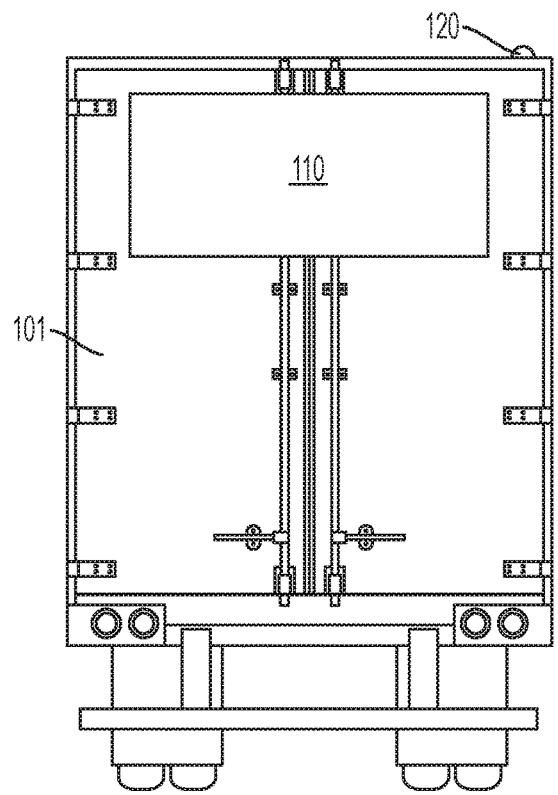
FIG. 1 is a rear elevational view of a semi-trailer having a mounted display of a vehicle exterior mounted display system built in accordance with single panel embodiment of the present invention.
Figure 2:
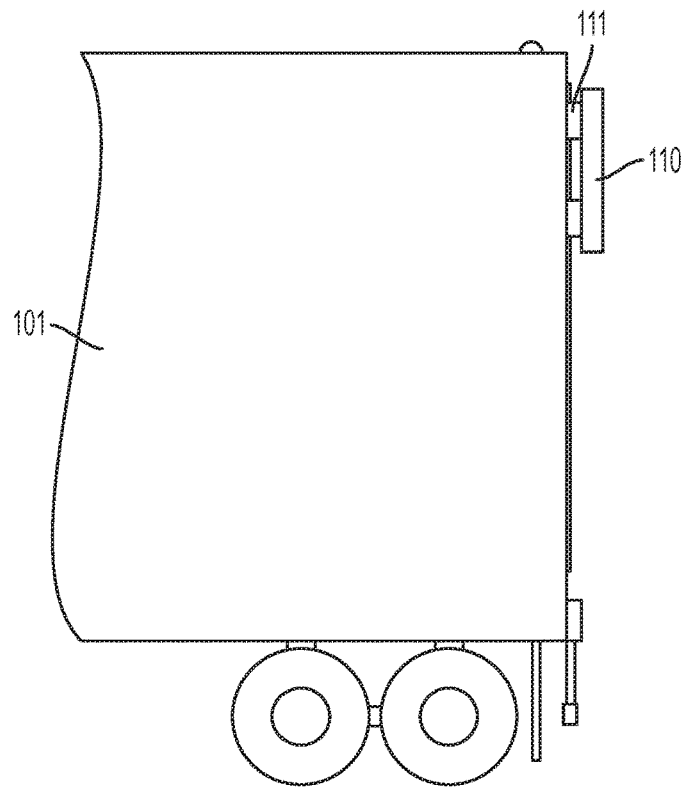
FIG. 2 is a side elevational view of a semi-trailer having a mounted display of a vehicle exterior mounted display system built in accordance with the present invention.
Figure 3:
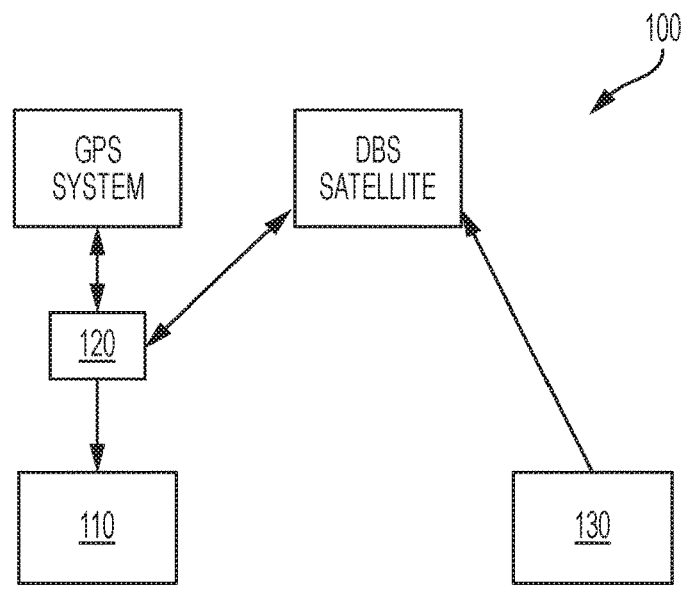
FIG. 3 shows the operative components of a vehicle exterior mounted display system built in accordance with the present invention.

Referring now to the drawings and in particular FIGS. 1, 2, and 3, a vehicle exterior mounted display system 100 is shown having a mounted display 110, a control unit 120, and an administration server 130. In one embodiment, the mounted display 110 defines an electronic video display, such as a conventional flat panel display, that attached to the back of a semi trailer 101 through a display mount 111 and is electrically connected by way of electrical wires that pass through the display mount 111 and along the to the electrical system of a tractor unit (not show) that tows the semi trailer 101. The mounted display 110 is also electrically connected to the control unit 120 so as to allow electrical signals defining video inputs to be received from the control unit 120 that are to be displayed on the mounted display 110. It is appreciated that in typical embodiments the mounted display 110 is housed in a weatherproof casing and that the display mount 111 is constructed of weatherproof material and bolted to the semi trailer 101. In addition, for single panel embodiments installed on swing open doors, it is contemplated that the display mount 111 may only be fixed to one of the doors so as to not obstruct the opening of the doors.

In one embodiment, a battery may be positioned inside the display mount 111 and electrically connected to the mounted display 110 and, in some instances, the electrical system of a tractor unit as well.

In one embodiment, the mounted display 110 is electrically connected to the control unit 120 through an electrical wire suited to transmit an electrical signal (as well as electrical power in some cases) defining a video input from the control unit 120 to the mounted display 110.

In some embodiments, it is contemplated that the mounted display 110 may be electrically connected to the control unit 120 through a wireless networking connection, such as a wireless personal area network or a wireless local area network. In such embodiments, it is appreciated that the same control unit 120 may be employed to transmit video inputs to a single mounted display 110 on the semi trailer 101, multiple mounted displays 110 on the semi trailer 101 that operate individually to separately output the content in the video input, or multiple mounted displays 110 on the semi trailer 101 that operate in combination to output the content in the video input together (as discussed below in reference to FIG. 4).

The control unit 120 defines a control system that includes a Global Positioning System ("GPS") receiver operative to receive geolocation and time data from GPS satellites, a direct-broadcast satellite ("DBS") antenna and receiver operative to receive signals from a DBS satellite, amplify the signal received from the DBS satellite, downconvert the block of frequencies to a lower block of intermediate frequencies, and decode the signal for transmission to the mounted display 110, and a controller that is interconnected with a power source available to the control unit 120 (typically the electrical system of the tractor unit), the GPS receiver, and the DBS antenna and receiver so as to (1) provide for the distribution of electrical power to GPS receiver and the DBS antenna and receiver and (2) access the electrical signals generated or handled by the from the GPS receiver and the DBS antenna and receiver. The controller also includes a software application which includes instructions that allows the controller to determine, based on the geolocation and time data, which video stream in the signal received from the DBS satellite to cause to be displayed on the mounted display 110 using the signals from the GPS receiver and the DBS antenna and receiver. This software application also includes instructions that allows the controller to continually update its determination of which video stream in the signal received from the DBS satellite to cause to be displayed on the mounted display 110 (and thus what video stream is in fact being displayed) in real time as the geolocation and time data changes, which it would when the vehicle on which the mounted display 110 and control unit 120 moves around throughout the day/night.

In this regard, it is contemplated that in some embodiments, the administration server 130 communicates with the DBS satellite and includes a programming software application that includes instructions that allow it to modify the output of the DBS satellite so that the signal being broadcast by the DBS satellite includes a plurality of video streams that individually include identifiers which indicate a desired location and/or a time for it to be broadcast. As such, the control unit 120 can use these identifiers to determine which video stream in the signal received from the DBS satellite to display on the mounted display 110 from such electronic tags (which may define meta elements).

It is appreciated that in some embodiments, the administration server 130 causes the DBS satellite to broadcast over a given region (which could be an entire continent, like North America, or a smaller area) all video streams that could be desired at a given geolocation and/or time in that region and allow the control units 120 to determine which stream to cause to be played on its associated mounted display 110.

It is contemplated that in some embodiments, a particular video stream may define one or a grouping of separate viewing material, such as images or videos, which may define advertisements or emergency messages/notifications.

In some embodiments, a parabolic antenna is movably positioned inside the domed control unit 120 on top of a motorized tilting and rotation platform. In such embodiments, it is contemplated that the controller may also be operative to move the platform so as to reposition the antenna in real time based on the geolocation data so that it points to the desired location in the sky to receive signals from the DBS satellite.

In one embodiment, the vehicle exterior mounted display system 100 may additionally include a discrete solar panel (not shown) positioned on top of the semi trailer 101 and a rechargeable battery (not shown), with each being electrically connected together and to the mounted display 110 and the control unit 120 so as to provide a supplemental power source for the mounted display 110 and/or the control unit 120.

Figure 4:
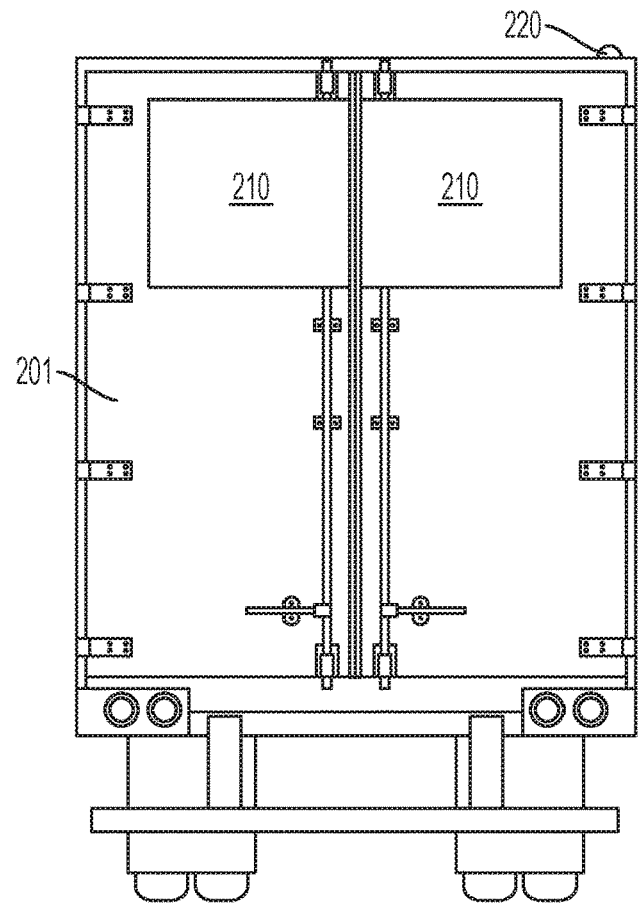
FIG. 4 is a rear elevational view of a semi-trailer having a mounted display of a vehicle exterior mounted display system built in accordance with double panel embodiment of the present invention.

Referring now to FIG. 4, in a double panel embodiment the mounted display 210 defines a first electronic video display and a second electronic video display, each attached to one of the doors on the back of a semi trailer 201 through their own display mount and positioned so that the edge of the displays are adjacent to one another. In typical implementations of the double panel embodiment, each of the discrete video displays the mounted display 210 are wireless connected to the control unit 220 in a manner which allows the control unit to determine their positions relative to one another and cause them to display a portion of the video content corresponding with such a relative position so that the combined mounted display 210 operates together to provide a single output.

In an alternate embodiment of a vehicle exterior mounted display system, the mounted display may be connected to a roll up door on the rear of a trailer. In such an embodiment, the display mount is connected to the door such that the top of the mounted display tracks the orientation of the portion of the door with which it is laterally aligned (so that the top of the mounted display bends back into the trailer as the door does). In one instance of this embodiment, the mounted display defines a flexible display screen.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A vehicle exterior mounted display system, comprising:
 a control unit configured to receive geolocation and time data from a global navigation satellite system as well as receive and process a signal that includes a plurality of video streams from a direct-broadcast satellite, wherein each of the plurality of video streams include at least one broadcast identifier which indicates at least one of a desired location and a time for the video stream to be broadcast;
 a mounted display defined by a plurality of discrete electronic visual displays and attached to an exterior a moving object, with a first multi panel display among the plurality of discrete electronic visual displays attached to a surface of a first part on the moving object and a second multi panel display among the plurality of discrete electronic visual displays attached to a surface of a second part on the moving object that is movable relative the first part on the moving vehicle;

wherein the first multi panel display and the second multi panel display are each attached to the moving vehicle through a mechanical attachment to a separate rigid display mount that is mechanically attached to said moving object and are positioned relative to one another such that an edge of the first multi panel display is can be positioned adjacent to an edge of the second multi panel display by positioning at least one of the first part and the second part;

wherein said mounted display is electrically connected to the control unit;

wherein said control unit is configured to automatically select a selected video stream from the plurality of video streams, based on the geolocation and time data from the global navigation satellite system and the at least one broadcast identifier included with the selected video stream, to cause just the selected video stream to be displayed on the mounted display, to automatically select an alternate video stream from the plurality of video streams in real time in response to ongoing changes on the geolocation and time data and the at least one broadcast identifier included with the alternate video stream, and to cause just the alternate video stream to be displayed on the mounted display; and wherein said control unit is configured to determine the position of the first multi panel display and the second multi panel display relative to one another and, when causing the display of at least one of the selected video stream and the alternate video stream on the mounted display, cause each of the first multi panel display and the second multi panel display to display a different portion of the at least one of the selected video stream and the alternate video stream that corresponds to the determined relative position so that the first multi panel display and the second multi panel display operate together as the mounted display displays the at least one of the selected video stream and the alternate video stream.

2. The vehicle exterior mounted display system of claim 1, additionally comprising an administration server communicatively connected to the direct-broadcast satellite, wherein said administration server is configured to indicate at least one of a targeted geolocation and a targeted time for individual video streams in the plurality of video streams.

3. The vehicle exterior mounted display system of claim 2, wherein the control unit is configured to select the selected video stream and the alternate video stream using the at least one of the targeted geolocation and the targeted time of the individual video streams in the plurality of video streams.

4. The vehicle exterior mounted display system of claim 2, wherein said administration server is configured to indicate the targeted geolocation and the targeted time for individual video streams in the plurality of video streams.

5. The vehicle exterior mounted display system of claim 2, wherein said administration server is configured to indicate at least one of the targeted geolocation and the targeted time for each individual video streams in the plurality of video streams.

6. The vehicle exterior mounted display system of claim 2, wherein said administration server is configured to indicate the targeted geolocation and the targeted time for each individual video streams in the plurality of video streams.

* * * * *